(12) United States Patent
Coggins et al.

(10) Patent No.: US 8,607,426 B1
(45) Date of Patent: Dec. 17, 2013

(54) METHOD AND APPARATUS FOR AUTOMATED VALVE SPRING ASSEMBLY

(75) Inventors: Timothy Paul Coggins, Traverse City, MI (US); John Eric Ammond, Traverse City, MI (US); Jack Patrick Moran, Jr., Rapid City, MI (US)

(73) Assignee: Air Way Automation, Inc., Grayling, MI (US)

( * ) Notice: Subject to any disclaimer, the term of this patent is extended or adjusted under 35 U.S.C. 154(b) by 3 days.

(21) Appl. No.: 13/465,758

(22) Filed: May 7, 2012

Related U.S. Application Data

(60) Provisional application No. 61/483,466, filed on May 6, 2011.

(51) Int. Cl.
*B23P 19/04* (2006.01)
*B23P 15/10* (2006.01)
*B23P 11/00* (2006.01)
*B23P 21/00* (2006.01)

(52) U.S. Cl.
USPC ............. 29/227; 29/222; 29/213.1; 29/225; 29/434; 29/771

(58) Field of Classification Search
USPC ........ 29/222, 213.1, 225, 227, 434, 436, 771; 254/93 R; 269/3, 6; 123/90.1, 90.65, 123/90.67
See application file for complete search history.

(56) References Cited

U.S. PATENT DOCUMENTS

| | | | |
|---|---|---|---|
| 3,239,925 A | 3/1966 | Piper | |
| 3,314,136 A | 4/1967 | Giles | |
| 3,377,691 A | 4/1968 | Kasper et al. | |
| 3,568,292 A | 3/1969 | Kasper | |
| 3,793,999 A | 2/1974 | Seiler et al. | |
| 4,494,306 A | 1/1985 | Immonen | |
| 4,845,821 A | 7/1989 | Sakimori et al. | |
| 4,879,795 A | 11/1989 | Nakamura et al. | |
| 4,879,796 A | 11/1989 | Nakamura et al. | |
| 5,097,579 A | 3/1992 | Pringault | |
| 5,375,308 A | 12/1994 | Harris | |
| 5,761,785 A | 6/1998 | Connolly | |
| 6,029,340 A | 2/2000 | Bramante | |
| 6,223,426 B1 * | 5/2001 | Kimmelmann et al. | 29/771 |
| 6,684,492 B2 | 2/2004 | Tachibana et al. | |

* cited by examiner

*Primary Examiner* — Monica Carter
*Assistant Examiner* — Nirvana Deonauth
(74) *Attorney, Agent, or Firm* — Price Heneveld LLP

(57) ABSTRACT

A method and apparatus for automated valve spring assembly includes a head assembly with elongated passageways that movably support a pair of retainer keys. A pair of control members selectively close off the passageways. The head assembly further includes a moveable divider plate and a pair of jaws. A push member or rod closes off the passageways by shifting the control members upon movement of the pushrod. The pushrod also slides the retainer keys such that the retainer keys contact tapered inner surfaces of the jaws and rotate the jaws outwardly. The retainer keys are thereby axially positioned relative to the end of a valve stem. The retainer plate is then retracted, and the jaws shift inwardly and push or position the retainer keys on the valve stem.

13 Claims, 12 Drawing Sheets

METHOD AND APPARATUS FOR AUTOMATED VALVE SPRING ASSEMBLY

CROSS REFERENCE TO RELATED APPLICATION

This application claims the benefit of U.S. Provisional Application No. 61/483,466, filed on May 6, 2011, entitled, METHOD AND APPARATUS FOR AUTOMATED VALVE SPRING ASSEMBLY, the entire contents of which are incorporated herein by reference.

BACKGROUND OF THE INVENTION

Internal combustion engines commonly include poppet valves to control the flow of intake and exhaust gases through the intake and exhaust ports, respectively. Poppet valve assemblies commonly include a poppet valve having a disc portion and a stem extending from the disc. The end of the stem may include one or more annular grooves. When the valves are assembled to a cylinder head of an internal combustion engine, the valve stem is inserted through a valve guide, and a valve spring is positioned around the valve stem. A valve spring cap is positioned on an outer end of the valve spring, and valve spring keys are positioned on the valve stem in engagement with the annular grooves. The valve spring is then allowed to expand, and the valve spring cap engages the valve spring keys, pushing the valve spring keys into engagement with the grooves. The valve spring keys and valve spring cap retain the valve spring in a compressed configuration.

With reference to FIGS. 7 and 8, a prior art poppet valve assembly 10 of the type used in internal combustion engines includes a valve 11 having a stem 12 and a valve disc portion 13. An end 14 of stem 12 includes a plurality of annular grooves 15. The valve assembly 10 further includes a helical coil spring 16, a valve spring cap 17, and a pair of valve stem keys 18. Outer surfaces 19 of valve stem keys 18 form a truncated cone that wedges tightly against the tapered sidewalls 20 of opening 21 of valve spring cap 17 when assembled with valve spring 16 in a compressed state acting against surface 22 of a cylinder head.

Various devices have been developed to assist in assembling poppet type valves for internal combustion engines. However, known tools and devices may suffer from various drawbacks.

SUMMARY OF THE INVENTION

One aspect of the present invention is a device or tool for assembling split valve stem keys, valve springs, valve spring caps, and poppet valves of the type having a disc and a stem for use in internal combustion engines. The device includes a body structure defining a pair of elongated passageways that are configured to moveably support split key components for guided movement through the passageways. The passageways define open ends. The open ends of the passageways may be positioned at a lower end of the device. The device further includes first and second jaws that are movably connected to the body structure. The jaws include opposing key-engaging surfaces that move towards and away from each other between outer engaged positions and inner disengaged positions. The key-engaging surfaces may be cylindrical, and the jaws may be biased to their engaged positions. The device further includes a power to push rod that is configured to push valve stem keys through at least a portion of the passageways. The passageways have end portions that are disposed adjacent to the key-engaging surfaces of the jaws. Movement of the push rod causes the jaws to rotate from the disengaged position outwardly towards the engaged position. The push rod pushes first and second valve stem key halves out of the open ends of the passageways and into engagement with the key-engaging surfaces of the first and second jaws, respectively. The first and second jaws thereby push the split key components inwardly towards an installed position wherein the split key components engage annular grooves adjacent and end of a stem of a poppet valve.

These and other features, advantages and objects of the present invention will be further understood and appreciated by those skilled in the art by reference to the following specification, claims and appended drawings.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
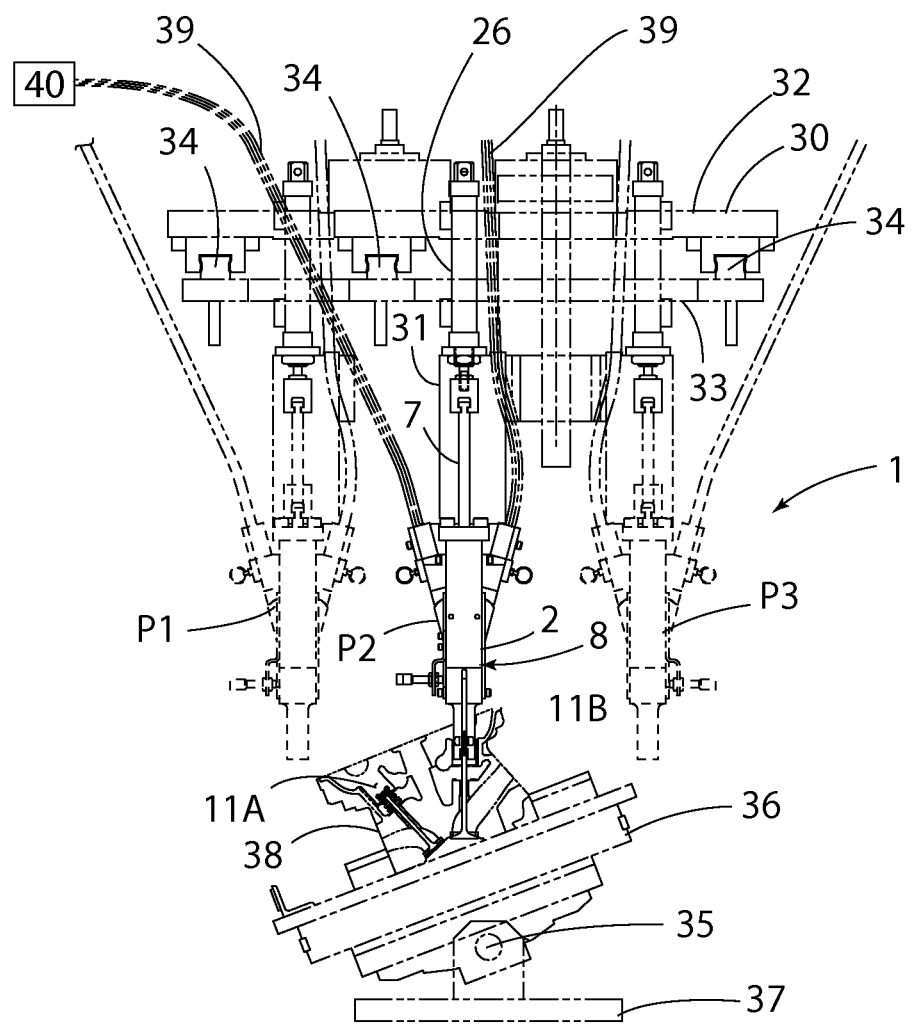
FIG. 1 is a partially schematic side elevational view of a device for assembling poppet valve assemblies according to one aspect of the present invention.

For purposes of description herein, the terms "upper," "lower, "right," "left," "rear," "front," "vertical," "horizontal," and derivatives thereof shall relate to the invention as oriented in FIG. 1.

With reference to FIG. 1, a device 1 according to one aspect of the present invention includes a body structure 2 defining a pair of elongated passageways 3 (see also FIG. 2) that are configured to moveably support key components 18 for guided movement through the passageways 3 in the direction of the arrows "A". As discussed in more detail below in connection with FIGS. 9 and 10, the passageways 3 define open lower ends 5, and the valve stem keys 18 are pushed out of the open ends 5 by lower ends 6 of a push rod 7.

Figure 9:
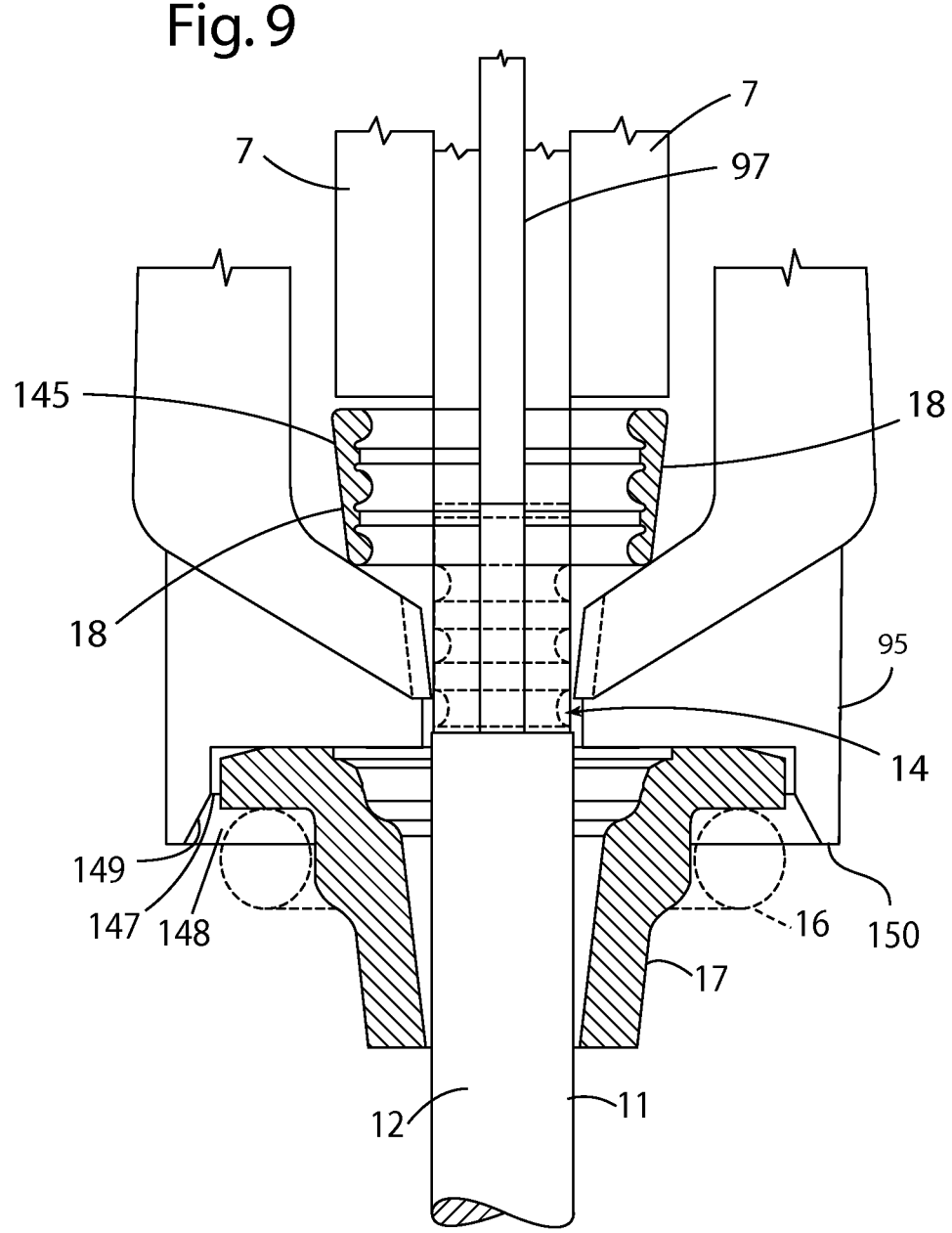
FIG. 9 is a partially fragmentary cross sectional view of a portion of the device of FIG. 4 taken along the line 9-9 showing the jaws in an inner position.
Figure 10:
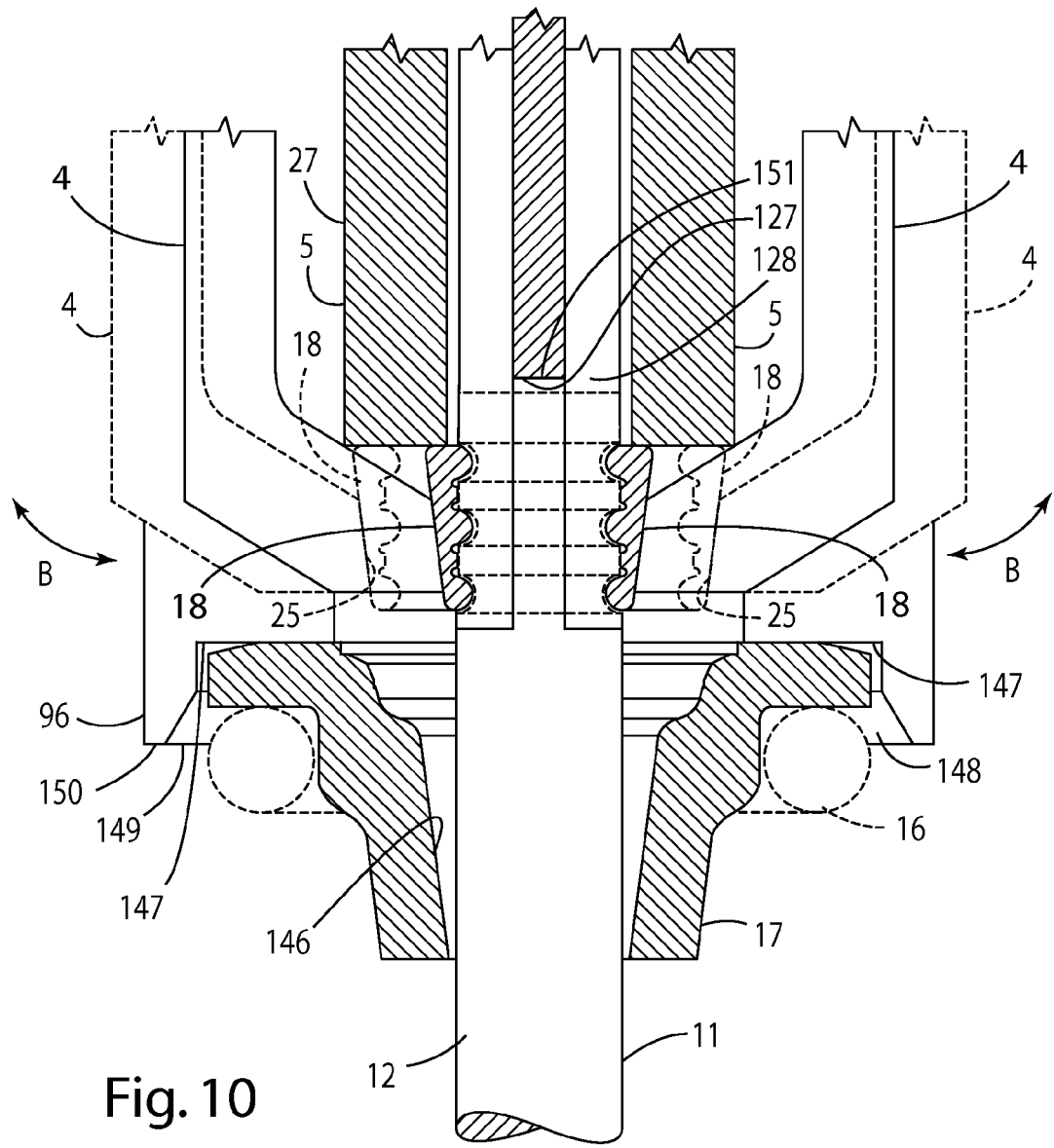
FIG. 10 is a partially fragmentary view of the device of FIG. 7 showing the jaws rotated outwardly.

Device 1 also includes first and second jaws 4 that are moveably connected to the body structure 2. The jaws 4 include key-engaging surfaces 25 that move towards and away from each other as indicated by the arrows "B" (FIGS. 9 and 10) between an outer engaged position (FIG. 10) in which the key-engaging surfaces 25 contact valve stem keys 18, and an inner disengaged position (FIG. 9). The jaws 4 are biased inwardly towards the disengaged position of FIG. 9. A push rod 7 is connected to a pneumatic cylinder 26 (FIG. 1) that shifts the push rod 7 in a vertical first direction "V" (FIG. 2) to thereby push valve stem keys 18 through elongated passageways 3. End portions 27 of elongated passageways 3 are disposed adjacent the key-engaging surfaces 25 of the jaws 4. Movement of the push rod 7 causes the jaws 4 to rotate from the disengaged position (FIG. 9) outwardly towards the engaged position (FIG. 10). The ends 6 of push rod 7 push first and second valve stem key halves 18 out of the open lower ends 5 of elongate passageways 3 into engagement with the key-engaging surfaces 25 of the jaws 4, and the jaws 4 push the split key components 18 inwardly towards an installed position in engagement with end 14 of valve stem 12.

Referring again to FIG. 1, body structure 2 forms a part of head assembly 8. Head assembly 8 is mounted to a support assembly 30 by a bracket 31. Support assembly 31 may include upper and lower plates 32 and 33, respectively that are moveably interconnected by one or more linear guides 34 and powered actuators (not shown) to move the head assembly 8 between positions "P1", "P2", and "P3". Support assembly 30 is configured to raise and lower head assembly 8. A cylinder head 38 is mounted to a fixture 36 that is rotatably mounted to a base 37 for movement about and axis 35. Fixture 36 may comprise a known fixture design, and it will therefore not be described in detail herein.

The overhead support assembly 30 may be configured to provide forward powered movement of head assembly 8 in a direction that is parallel to the axis 35 to thereby move head assembly 8 along cylinder head 38 to align head assembly 8 with successive combustion chambers and valves in cylinder head 38. Also, a plurality of head assemblies 8 may be connected to the support assembly 30 to thereby simultaneously install a plurality of valve stem keys 18 in a cylinder head 38. In the illustrated example, cylinder head 38 includes a plurality of intake valves 11A, and a plurality of exhaust valves 11B. Fixture 36 and cylinder head 38 may be rotated about axis 35 to selectively align either the intake valve 11A or exhaust valve 11B with head assembly 8. The elongated passageways 3 in body structure 2 are connected to elongated flexible lines 39. The flexible lines 39 are made of a polymer material according to a known design, and they may be connected to an automated feed system 40 that supplies the valve stem keys 18 to the head assemblies 8 through flexible lines 39. The automated feed system 40 may be a known commercially available unit.

Figure 2:
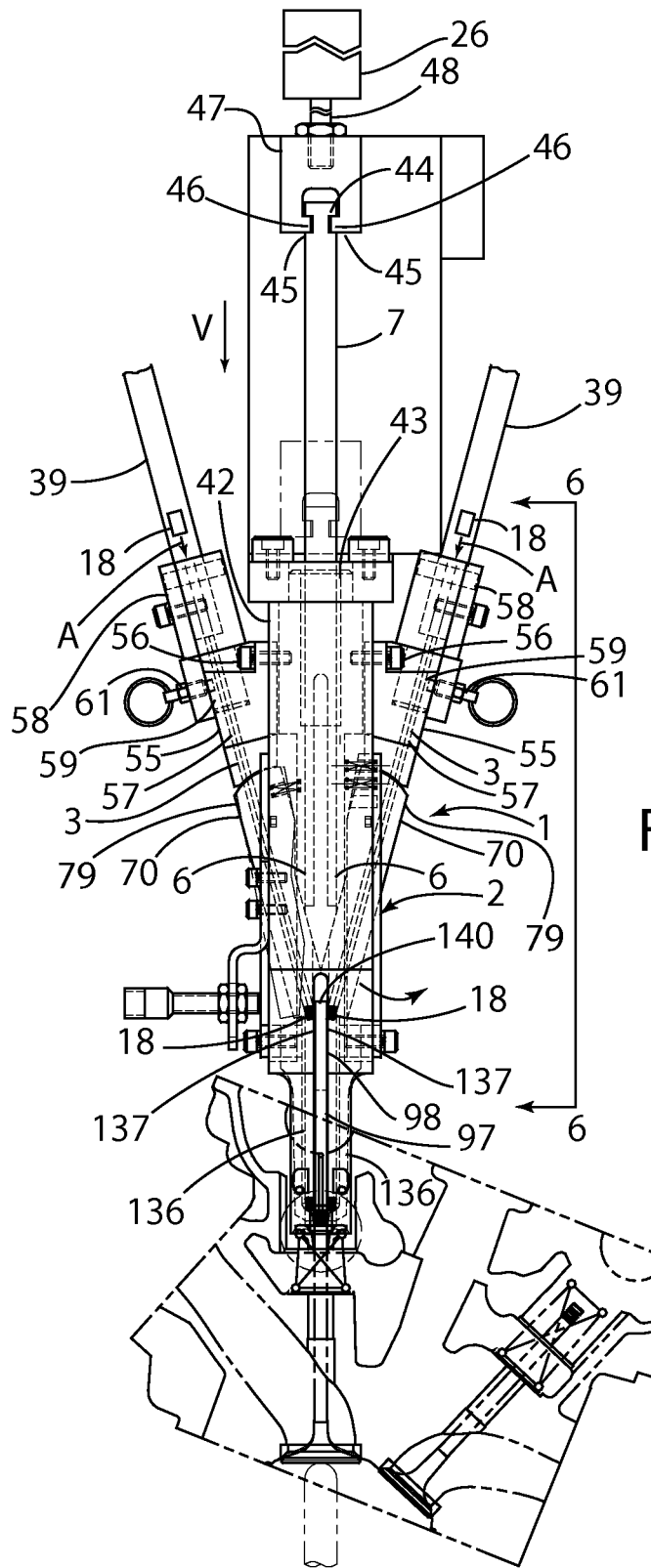
FIG. 2 is an enlarged view of a portion of the device of FIG. 1.

With further reference to FIG. 2, the body structure 2 includes a main block 42 (see also FIG. 5) having an elongated central passageway 43 that slidably receives push rod 7. Upper end 44 of push rod 7 includes a pair of grooves 45 (see also FIG. 5) that receive ends 46 of a connecting shaft 48 of pneumatic cylinder 26 is connected to connecting block 47 to thereby provide for powered reciprocating motion of push rod 7. Referring again to FIG. 5, lower end 49 of push rod 7 includes an elongated slot 50 that forms a pair of lower ends 6. (Push rod 7 is fragmented in FIG. 5, and lower end 49 of push rod 7 is therefore shown removed from passageway 43).

Figure 3:
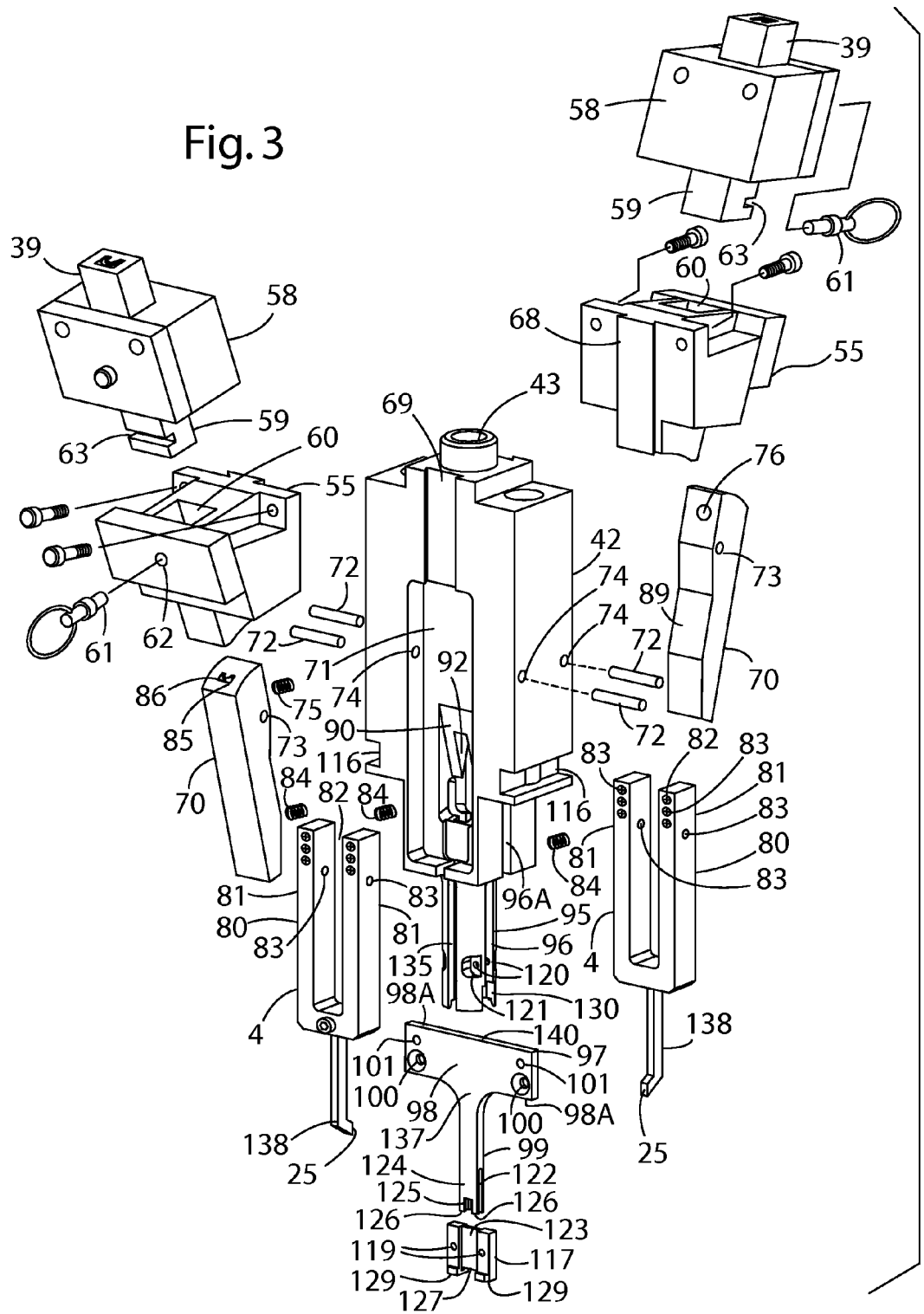
FIG. 3 is an exploded isometric view of several of the device.

Referring again to FIGS. 2 and 3, a pair of support blocks 55 are removably attached to the main block 42 by threaded fasteners 56. An intermediate portion 57 of elongated passageways 3 is formed in support blocks 55. Outer blocks 58 include extensions 59 that are received in openings 60 of support blocks 55. Spring-loaded pins 61 are mounted in openings 62 of support blocks 55. When assembled, pins 61 engage grooves 63 on extensions 59 of outer blocks 58 to thereby retain outer blocks 58 to blocks 55. The extensions 59 are closely received in openings 60 in blocks 55 to thereby insure that intermediate portions 57 of the elongated passageways 3 are aligned with upper portions 66 of elongated passageways 3 formed in outer blocks 58. Plates 64 are secured to outer blocks 58 by threaded fasteners 65 to thereby clamp and retain flexible lines 39 to outer blocks 58. An outer or upper portion 66 of elongated passageways 3 is formed in outer blocks 58. Blocks 55 include dove tail extensions 68 which are slidably received in dove tail grooves 69 formed in main block 42 to thereby insure that support blocks 55 are properly positioned on main block 42.

Figure 4:
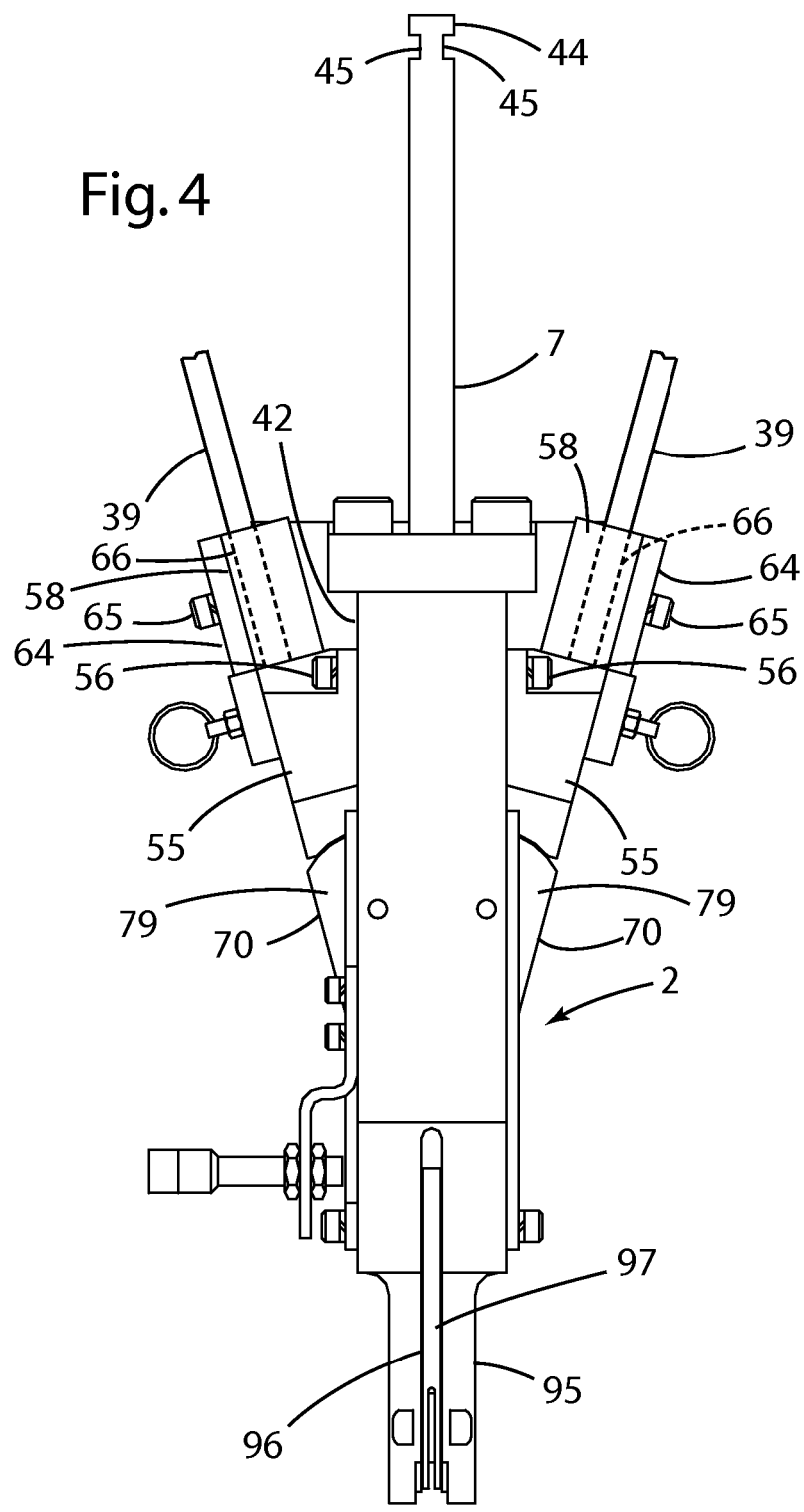
FIG. 4 is a side elevational view of the device of FIG. 2.
Figure 5:
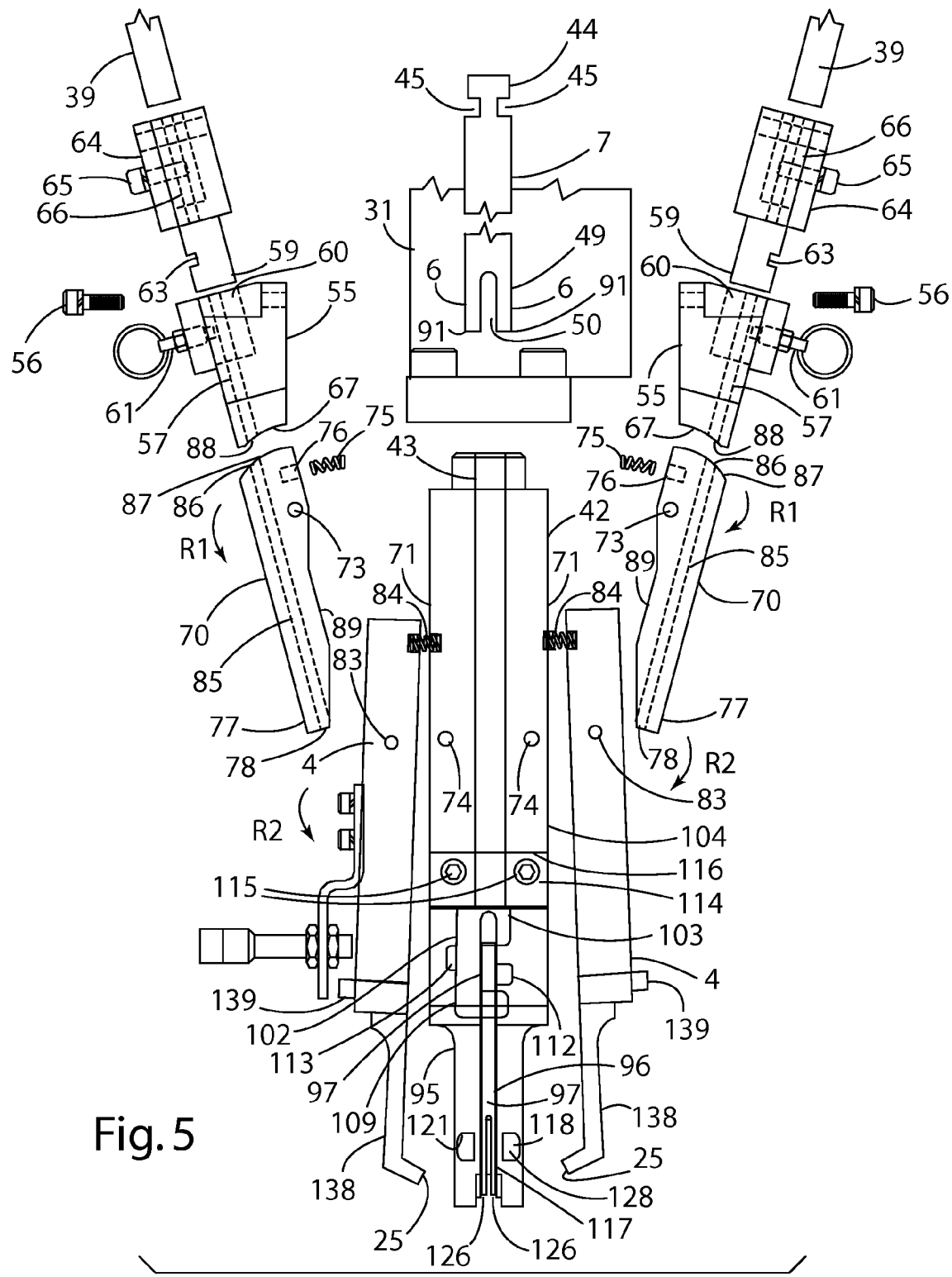
FIG. 5 is an exploded view of the device of FIG. 1.

Referring to FIGS. 4 and 5, a pair of guide members and/or control members 70 are pivotally mounted to main blocks 42 by pins 72 which are received in openings 73 (FIG. 5) in guide members 70 and openings 74 in main block 42. When assembled, guide members 70 are positioned in pockets 71 (see also FIG. 3) formed in main block 42.

Figure 6:
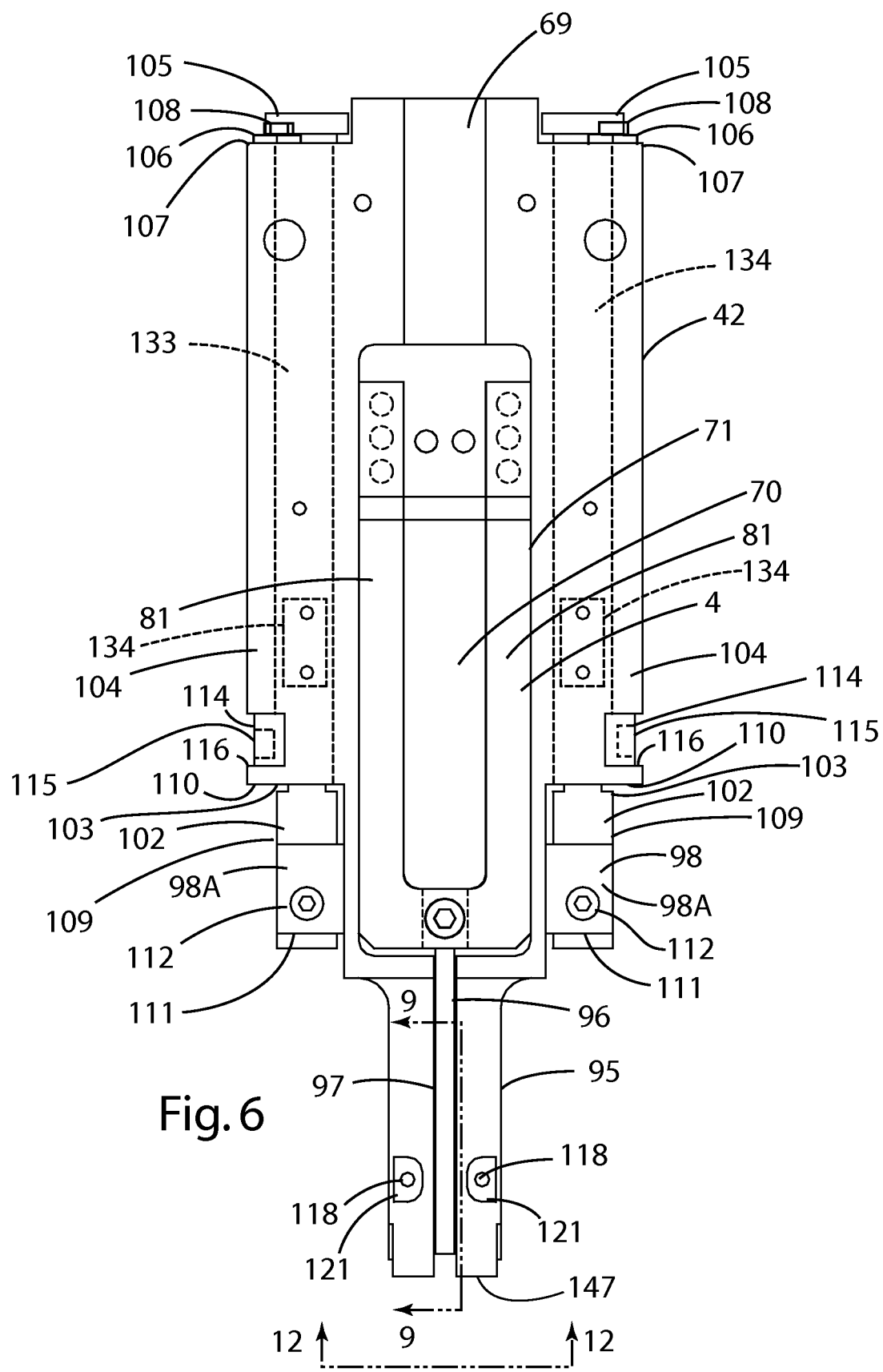
FIG. 6 is a side elevational view of the device of FIG. 2 taken along the line 6-6.

Jaws 4 include U-shaped upper portions 80 (see also FIG. 6) including spaced apart upwardly-extending legs 81 and a gap 82 between the legs 81. When assembled, lower ends 77 of guide members 70 are disposed in gap 82 between legs 81 of jaws 4 as shown in FIG. 6, with a small upper portion 79 (FIG. 4) of guide members 70 protruding outwardly from main block 42. The U-shaped upper portions 80 of jaws 4 are also disposed in pockets 71 of main block 42 when assembled, and pins 72 extend through openings 83 in upwardly extending legs 81 of jaws 4 to thereby pivotably interconnect jaws 4 with main block 42. Springs 75 are received in pockets 76 formed in guide members 70 to thereby rotatably bias guide members 70 in the direction of the arrows "R1" (FIG. 5), thereby biasing the lower ends 77 of guide members 70 inwardly towards main block 42. Similarly, springs 84 are received in pockets 83 in upwardly extending legs 81 of jaws 4 to thereby rotationally bias the jaws 4 in the direction of the arrows "R2" (FIG. 5). The springs 84 thereby bias the key-engaging surfaces 25 of jaws 4 towards one another.

Elongated passageways 3 include portions 85 that are formed in guide members 70. The portions 85 of passageways 3 include open upper ends 86 formed in curved upper surfaces 87 of guide members 70. When pushrod 7 is in a raised position, springs 75 bias guide members 70 such that inner surfaces 89 of guide members 70 contact angled surface 90 in pockets 71 of main block 42, thereby limiting rotation of guide members 70 and retaining guide member 70 in a rest position. When guide members 70 are in the rest position, open upper end 86 of passageways are aligned with lower openings 88 of passageways 3, thereby permitting valve stem keys 18 to slide from internal passageway portion 57 in support blocks 55 into passageway portions 85 in guide members 70. However, as pushrod 7 is moved downwardly, outer corners 91 of lower ends 6 of push rod 7 contact inner surfaces 89 of guide members 70 as the corners 91 move out of opening 92 (FIG. 4) at the lower end of elongated central passageway 43 in main block 42. As the outer corners 91 of push rod 7 slide along inner surfaces 89 of guide members 70, and guide members 70 rotate in a direction opposite the arrows "R1" (FIG. 5) to an outer or actuated position and the lower ends 77 of guide members 70 rotate outwardly. Rotation of guide members 70 causes open upper end 86 of passageway portion 85 to move such that it is no longer aligned with lower opening 88 of passageway portion 57 in support blocks 55. When guide members 20 are in the outer, actuated position, upper surfaces 87 of guide members 70 block openings 88 of passageway portions 57, thereby selectively blocking/preventing keys 18 from entering portions 85 of passageways 3 in guide members 70. The keys 18 therefor enter portions 85 of passageways 3 one at a time each time pushrod 7 is shifted downwardly.

Figure 11:
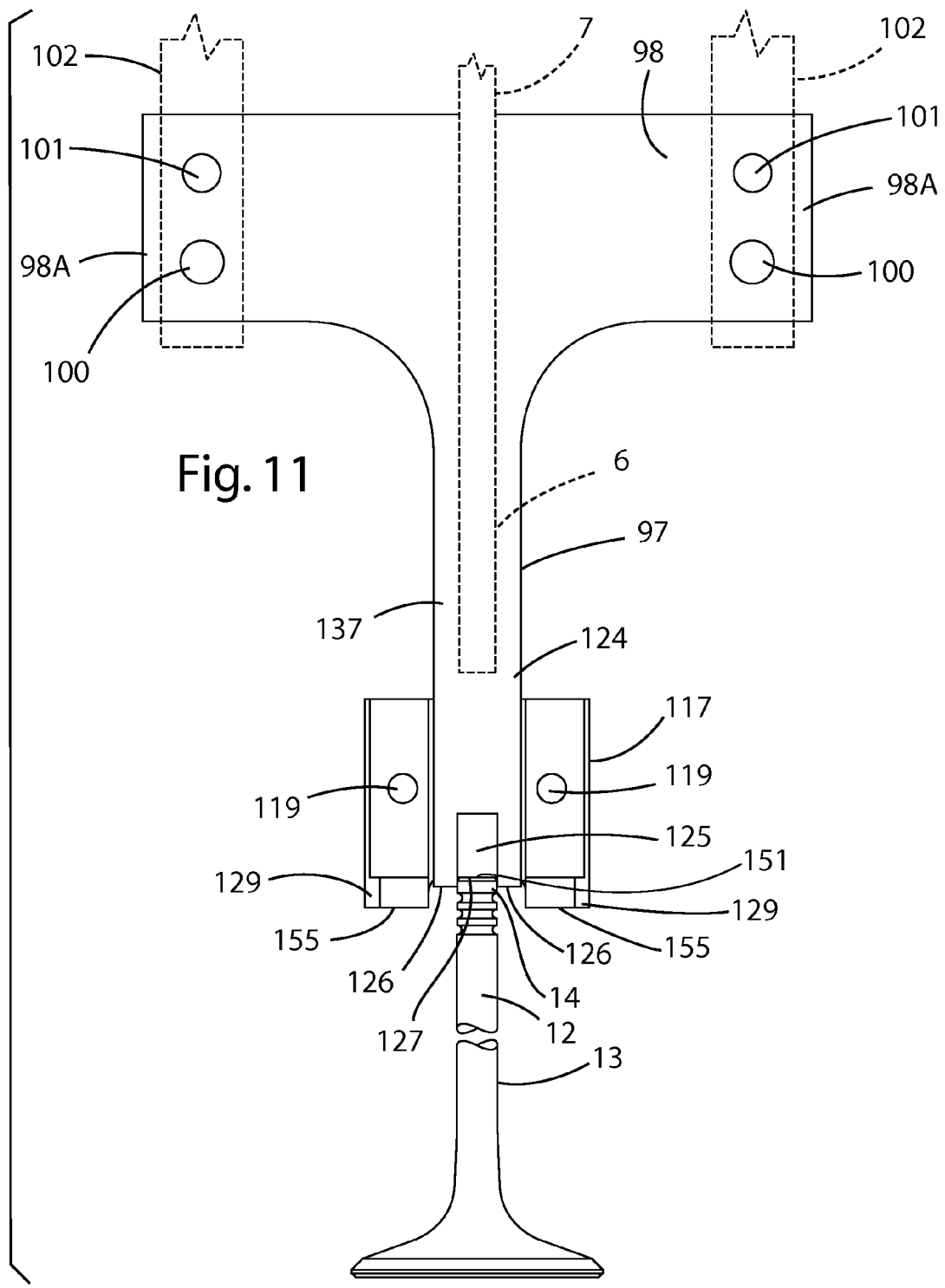
FIG. 11 is a partially fragmentary view of a removable insert that forms a portion of passageways along which valve stem keys travel.

Main block 42 includes a lower extension 95 that has a generally cylindrical shape. A slot 96 in extension 95 receives a guide or separator plate 97. Referring to FIG. 11, a separator guide plate 97 is generally T-shaped, with an upper transverse portion 98, and an elongated downwardly extending center portion 99. The transverse upper portion 98 of separator guide plate 97 includes opposite end portions 98A. The opposite end portions 98A include first openings 100 and second openings 101. With reference back to FIG. 6, a pair of pushrods or bars 102 are movably disposed in openings or bores 103 extend along outer side portions 104 of main block 42. The bores 103 may be configured to guide bars 102 to provide linear reciprocating motion of bars 102. Also, an electrical or pneumatic powered actuator may be operably connected to bars 102 to selectively shift bars 102 and separator/guide plate 97 relative to main block 42. Also, springs 134 (FIG. 6) may be positioned inside main block 42 to bias rods 102 and separator/guide plate 97 upwardly, and compressed air may be selectively applied to cylindrical cavities 133 in main block 42 to overcome the upward bias generated by springs 134. The bars 102 are generally cylindrical, and include an upper disc or stop portion 105 that bears against a spacer 106. The spacers 106 may comprise washers that are secured to main block 42 utilizing threaded fasteners 108 that are received in threaded openings in main block 42. The spacers 106 bear against upper surface 107 of main block 42. The discs/stops 105 of bars 102 limit the downward travel of bars 102, and also provide a structure to grip or pry against to pull the bars 102 out of main block 42 if necessary.

Referring to FIG. 6, lower ends 109 of bars 102 protrude from a lower surface 110 of main block 42. Lower ends 109 of bars 102 include slots 111 having a width that is substantially equal to the height of end portions 98A of upper transverse portion 98 of separator guide plate 97. Threaded fasteners 112 extend through openings 100 in opposite ends 98A of upper transverse portion 98 of separator guide plate 97 and into threaded openings (not shown) in lower ends 109 of bars 102 to thereby secure the guide plate 97 to the bars 102. Second threaded fasteners 113 are threadably received in threaded openings in lower ends 109 of bars 102. The second threaded fasteners 113 include ends (not shown) that engage openings 101 (FIG. 4) in opposite ends 98A of transverse portion 98 of separator guide plate 97 to thereby locate and retain separator guide plate 97 relative to the bars 102. A pair of bars or plates 114 are received in slots 116 of outer side portions 104 of main block 42. Threaded fasteners 115 secure the plates or bars 114 to main block 42. The plates or bars 114 optionally bear against rods or bars 102 to thereby guide the bars 102 to prevent unwanted movement of bars 102 relative to main block 42 that might otherwise result from clearance between bars 102 and openings 103 through main block 42. As discussed in more detail below, in operation a powered actuator (pneumatic) selectively raises and lowers bars 102 and separator guide plate 97 to selectively retain keys 18 in separated positions or state prior to installation of the keys 18 on valve stems 12.

An insert 117 (FIG. 3) includes a central web or wall 123 that is received in a slot 122 at a lower end 124 of center portion 99 of separator guide plate 97. Insert 117 also includes enlarged side portions 129 that are received in pockets 130 of extension 95 of main block 42 when assembled (see also FIGS. 12 and 13). The separator guide plate 97 and insert 117 are installed to main block 42 by inserting the separator guide plate 97 and insert 117 into slot 96 in extension 95 of main block 42. Pins 118 extend through openings 119 in insert 117, and through openings 120 in extension 95 of main block 42 to thereby securely position the insert 117. Pins 118 are conventional hardened pins having C-clips (not shown) positioned in grooves in the pins 118. The C-clips are disposed in pockets 121 of extension 95 of main block 42.

Referring again to FIG. 3, lower end 124 of separator guide plate 97 includes slots 125 (see also FIG. 11) in addition to slots 122. Slots 122 and 125 together form four downwardly-extending prongs 126 (FIG. 5). When insert 117 is assembled with guide plate 97, the prongs 126 extend beyond lower edge 127 of central web 123 of insert 117.

Figure 12:
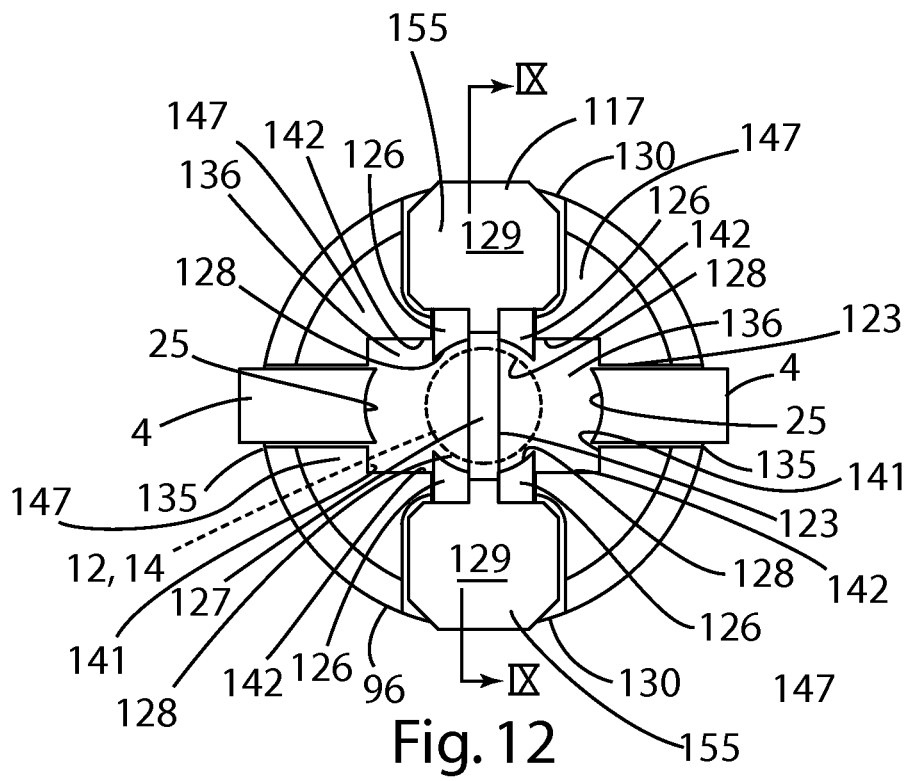
FIG. 12 is an enlarged view of the end of the device of FIG. 4 showing the jaws in the inner, disengaged position.
Figure 13:
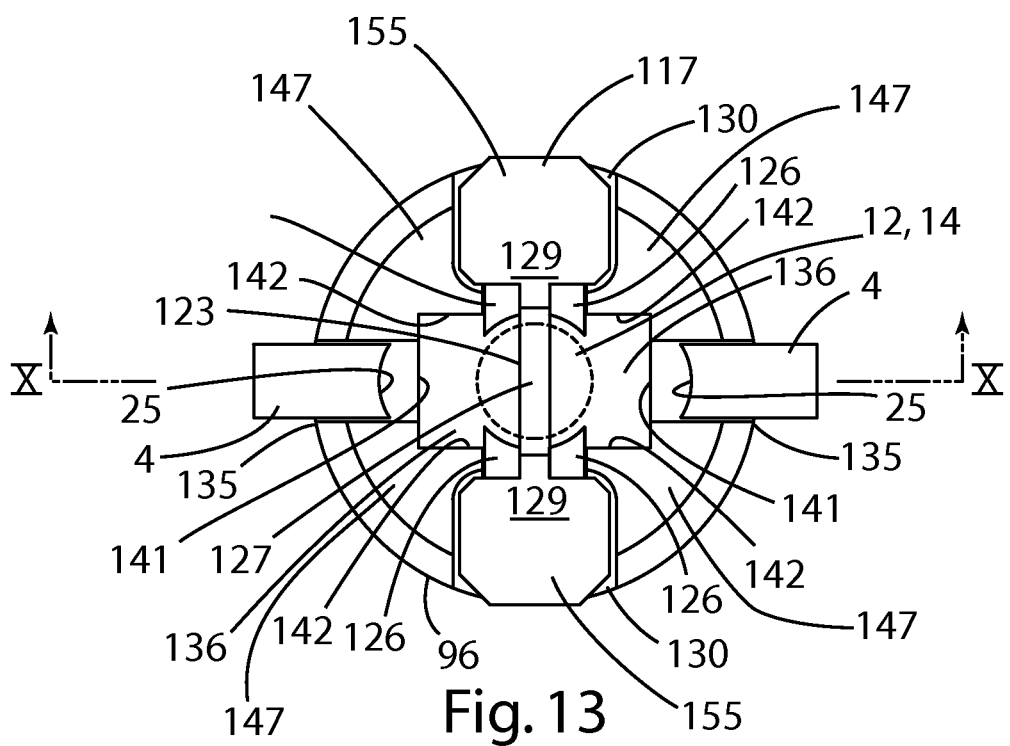
FIG. 13 is an end view of the device of FIG. 12 showing the jaws in the outward position.
Figure 14:
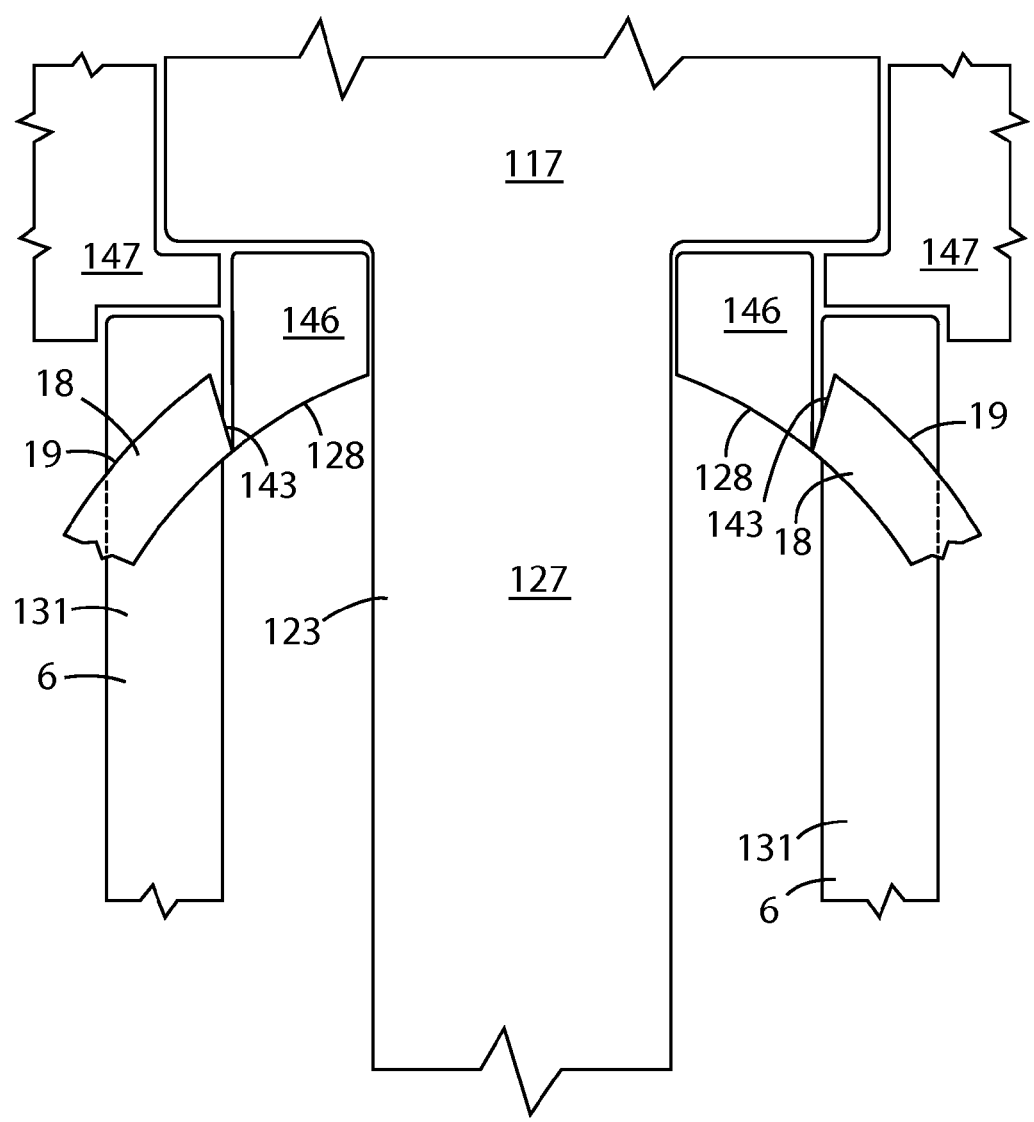
FIG. 14 is an enlarged view of a portion of the device of FIGS. 12 and 13.

With further reference to FIGS. 12-14, prongs 126 include inner surfaces 128. The inner surfaces 128 are preferably cylindrical, and correspond to the shape of end 14 of stem 12 to thereby locate and guide valve stem 12 when valve stem 12 is in contact with surfaces 128 during operation. Although the surfaces 128 of prongs 126 are preferably cylindrical, the surfaces 128 could be planar, or could have other shapes that guide and/or support the valve stem 12. End surfaces 131 of lower ends 6 of push rod 7 are positioned directly adjacent to prongs 126, and contact the valve key parts 18 to push them through the lower portions 136 of elongated passageways 3. Referring again to FIG. 11, the end surface 14 of valve stem 12 abuts lower edge 127 of central web 123 of insert 117 when a valve 13 is in position immediately prior to installation of valve stem keys 18 onto valve 13. In this way, the central web 123 of insert 117 and prongs 126 serves to center valve stem 12, and to positively locate the valve 13 vertically relative to the head assembly 8.

Key-engaging surfaces 25 of jaws 4 are preferably cylindrical, and have a shape that closely corresponds to outer surfaces 18A of key components 18.

Referring again to FIG. 5, end portions or pieces 138 of jaws 4 may comprise separate components that are secured to U-shaped upper portions 80 of jaws 4 utilizing threaded fasteners 139. End pieces 138 may be configured to grasp/guide keys 18 of various sizes. Thus, the jaws 4 can be readily configured or reconfigured for keys 18 of different sizes by changing out the end pieces 138 for different end pieces 138 configured for the particular size/design of keys 18 being used.

Figure 7:
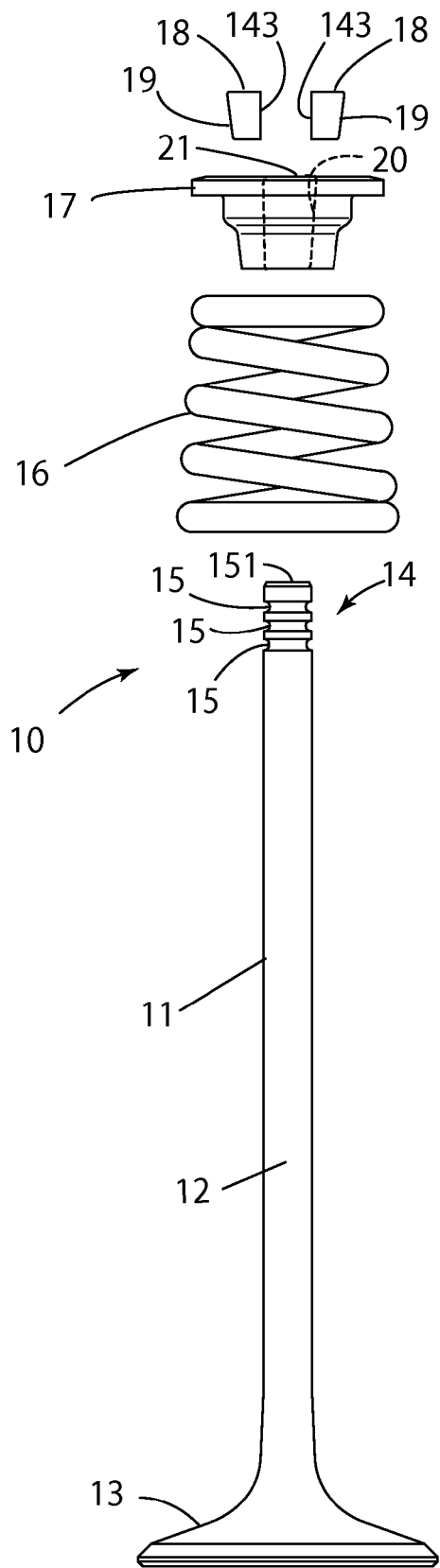
FIG. 7 is an exploded view of a prior art poppet valve assembly.

Referring to FIGS. 2 and 5, open lower ends 78 of passageway portions 85 in guide members 70 are positioned immediately adjacent outer surfaces 137 of guide plate 97 immediately adjacent upper edge 140 of separator guide plate 97 when guide members 70 are rotated outwardly by ends 6 of push rod 7. Lower ends 136 of passageways 3 are defined by inwardly facing surfaces 141 and 142 that are formed in downwardly extending portion 95 of main block 42, and outwardly facing side surfaces 137 of separator guide plate 97. Key components 18 are disposed in passageway 136 with edges 143 (see also FIG. 7) of keys 18 in sliding contact with outer surface 137 of separator guide plate 97. The key components 18 may also be positioned/guided by surfaces 141 and 142 formed in main block 42.

With reference to FIGS. 9 and 10, a pocket 148 is formed at lower end 150 of extension 95 of main block 42. Pocket 148 includes a flat support surface 147, and a tapered or conical surface 149. Pocket 148 locates a valve spring cap 17 in position during operation of device 1. During operation, a coil spring 16 is positioned over valve stem 12 in contact with valve spring cap 17 to thereby push valve spring cap 17 into contact with surface 147 of main block 42. End surface 151 of valve stem 12 is positioned against end surface 128 of web 123 to thereby vertically position valve 11.

During operation, head assembly 8 is aligned with a valve 11 positioned in fixture 36, and head assembly 8 is shifted linearly to bring lower end surfaces 155 (FIG. 11) of enlarged side portions 129 (FIGS. 12, 13) of inserts 117 into contact with a valve spring cap 17 (FIGS. 7, 8) that is initially positioned on a valve spring 16, with the valve spring 16 in an uncompressed state on cylinder head 38. As head assembly 8 is shifted downwardly, end surfaces 129 of inserts 117 of separator/guide plate 97 contact cap 17 on valve spring 16. As shown in FIGS. 9-11, when valve spring 16 is fully compressed, end surface 151 of valve 11 may contact edge surface 127 of central web 123 of separator/guide plate 97, between prongs 126 of pushrod 7 (see also FIGS. 12, 13).

When valve spring 16 is compressed, a pair of keys 18 are pushed along passageways 3 under air pressure and/or gravity to a lower position (FIG. 9) wherein the two keys 18 of the pair are held apart by the lower end of separator/guide plate 97. The pushrod 7 is then driven downwardly by powered actuator 26 to rotate guide members 70 outwardly and close off passageways 3 to prevent additional keys 18 from traveling through passageway portions 85 of guide members 70 and thereby prevent additional keys from traveling down and contacting the pair of keys 18 that is about to be installed (FIG. 9).

The lower ends 6 of pushrod 7 then contact keys 18 and slide the keys 18 downwardly until the keys 18 are positioned vertically in the proper location relative to end 14 of valve 11, with the raised annular ridges on the inside of the keys 18 aligned with annular grooves 15. The surfaces 25 of jaws 4 are initially positioned inwardly (FIG. 9). As pushrod 7 pushes keys 18 downwardly, keys 18 contact tapered surfaces 145 of jaws 4 pushing the jaws 4 rotationally outwardly out of engagement with keys 18 by the opposite keys 18 are spaced apart by outer surfaces 125 (FIG. 11) of the lower end of plate 97.

The separator plate 97 is then retracted upwardly, permitting jaws 4 to push keys 18 inwardly into position or end 14 of valve 11. Significantly, separator plate 97 axially positions valve 11 relative to keys 18 as keys 18 slide into position, thereby ensuring that keys 18 are properly positioned and therefore properly engage valves 11.

Head 8 is then shifted upwardly to allow springs 11 to push spring cap 17 upwardly into engagement with keys 18. Pushrod 7 is then retracted, and separator plate 97 is shifted downwardly to an extended position to thereby prepare for installation of the next pair of keys 18.

Keys 18 are introduced into flex lines 39 (FIG. 1) by automated feed system 40. The keys 18 slide downwardly through flex lines 39 and into passageways portions 66 in outer blocks 58. The key components 18 slide downwardly due to gravity and/or air pressure and/or a vacuum applied to lower ends of passageways 3. Keys 18 travel through intermediate portion 57 of passageways 3 formed in support blocks 55 and passageways 85 in guide members 70. Push rod 7 is moved downwardly upon actuation of pneumatic cylinder 26, and the end corners 91 (see also FIG. 5) of ends 6 of push rod 4 contact inner surfaces 89 of guide members 70, thereby rotating guide members 70 outwardly to align lower openings 78 of guide members 70 with lower passageway portions 136 as shown in FIG. 2. Outward rotation of guide members 70 also causes end surfaces 67 of blocks 55 to block openings 86 in guide member 70 to prevent entry of more keys 18 into passageways 85.

Figure 8:
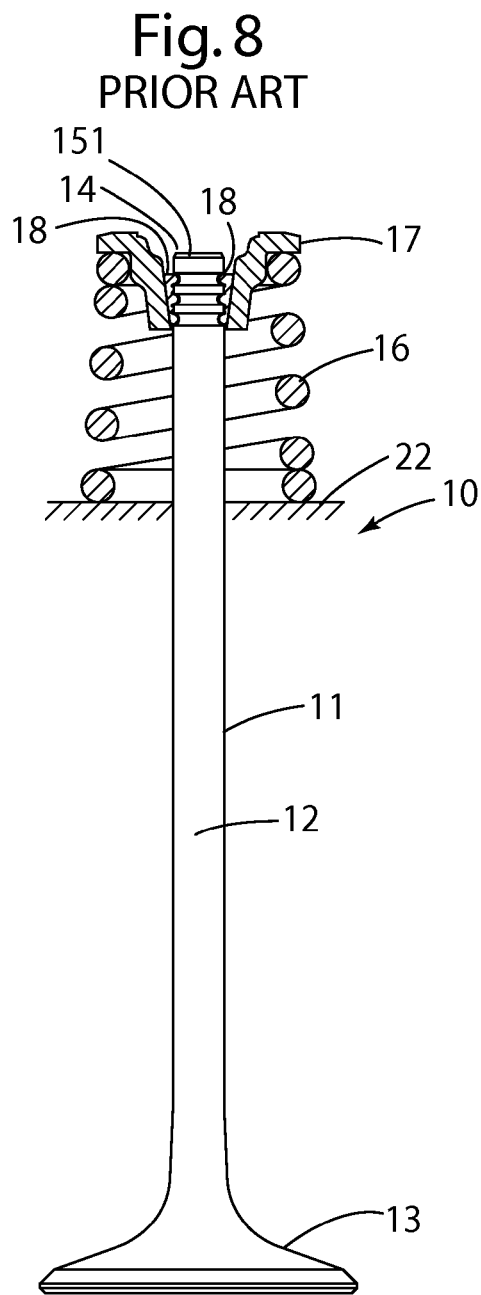
FIG. 8 is a prior art poppet valve assembly in the assembled condition.

The push rod 7 continues moving downwardly, and the end portions 6 of push rod 7 push the keys 18 through lower passageway portions 136. When the keys 18 reach the position shown in FIG. 9, the keys 18 may contact tapered, inwardly-extending surfaces 145 of jaws 4. As the push rod 7 continues moving downwardly, key components 18 may slide against surfaces 145 of jaws 7, pushing the jaws outwardly to the position shown in FIG. 10. The key components move downwardly into engagement with key-engaging surfaces 25 of jaws 4, and the inward bias on jaws 4 causes them to rotate inwardly, thereby shifting the keys 18 inwardly from the position shown in FIG. 10 to an installed position as shown in FIG. 8 wherein the keys 18 engage grooves 15 at upper end 14 of stem 12 of valve 11. Valve stem 12 is then moved downwardly, causing the keys 18 to slide downwardly into contact with tapered/conical inner surface 146 of valve spring cap 17. The spring bias acting on jaws 4 holds the key components 18 in position on valve stem 12 as the valve 11 is moved downwardly, thereby insuring that keys 18 remain in position as they are moved into contact with conical surface 146 of valve spring cap 17.

The device 1 reliably positions valve stem key components 18 on valves 11. The inward bias of jaws 7 insure that the key components 18 remain in contact with annular grooves 15 formed at the upper end 14 of valve stem 12 as the key components are moved into contact with the valve spring cap 17.

The invention claimed is:

1. A device for assembling valve springs to a cylinder head of an internal combustion engine, the device comprising: a head assembly including upper and lower ends and defining an axis extending between the upper and lower ends, wherein the lower end is configured to compress a valve spring on the cylinder head to permit assembly of a spring retainer cap and a pair of retainer keys to a valve of the cylinder head, the head assembly including: a support structure; a pair of elongated passageways configured to movably support the pair of retainer keys for movement of the pair of retainer keys from first ends of the passageways to second ends that are located adjacent the lower end of the head assembly wherein the pair of elongated passageways each receive an individual retainer key from the previously mentioned pair of retaining keys; a pair of control members movably interconnected to the support structure for movement between open and closed positions, wherein the control members are configured to selectively close off the passageways when in the closed positions to selectively prevent the pair of retainer keys from traveling from the first ends to the second ends of the passageways; a divider plate movably interconnected with the support structure for powered reciprocating movement between extended and retracted positions, the divider plate having a lower end defining oppositely facing guide surfaces that are configured to movably support the pair of retainer keys in spaced apart locations that permit an end of a valve to be positioned between the pair of retainer keys when the divider plate is in the extended position; pair of jaws movably connected to the support structure, the jaws having end portions that are selectively movable inwardly and outwardly relative the axis of the head assembly between inward and outward positions, wherein the end portions are biased towards the inward position, and wherein the end portions define inwardly-facing key-engagement surfaces configured to engage curved outer surfaces of the pair of retainer keys to push the pair of retainer keys towards one another onto a valve stem upon movement of the divider plate from the extended position to the retracted position; a powered actuator; a push member operably connected to the powered actuator for powered movement between extended and retracted positions, wherein the push member is configured to engage the pair of retainer keys and move the pair of retainer keys along portions of the passageways adjacent the second ends as the push member moves from the retracted position to the extended position; and wherein: the jaws include tapered surfaces adjacent the key-engaging surfaces whereby at least one of the retainer keys and the push member engage the tapered surfaces and shift the jaws outwardly as the push member moves to the extended position, such that retraction of the divider plate causes the pair of retainer keys to be shifted inwardly towards one another by the jaws onto the end of a valve stem.

2. The device of claim 1, wherein the divider plate is movably interconnected with the support structure by a pair of elongated rod members that are selectively biased in a first direction by compressed air, and biased in a second direction by a pair of springs, whereby a pressure of the compressed air can be controlled to selectively shift the divider plate in the first direction.

3. The device of claim 2, wherein the support structure comprises a substantially rigid block of material having a pair of elongated bores, and wherein the elongated rod members of the divider plate are moveably received in the bores for reciprocating motion.

4. The device of claim 1, wherein the support structure comprises a substantially solid block of material, and wherein the jaws are pivotally connected to the substantially solid block of material.

5. The device of claim 4, wherein the control members are pivotally connected to the substantially solid block of material.

6. The device of claim 5, wherein the control members include a elongated passageway portions therethrough having upper and lower opposite open ends, whereby rotation of the control members selectively closes off the open upper end of the passageway.

7. The device of claim 6, wherein the push member comprises an elongated pushrod slidably received in an elongated central opening in the block of substantially solid material, and wherein movement of the pushrod causes the pushrod to contact the control members and rotate the control members from an open position to a closed position to close off the passageways.

8. The device of claim 7, wherein the control members are biased towards the open position, and include lower ends that are biased inwardly, and wherein the pushrod slidably contacts the lower ends of the control members to thereby rotate the lower ends outwardly against the bias.

9. The device of claim 8, wherein the jaws include U-shaped upper portions and wherein a portion of the control members is received between the U-shaped portions.

10. The device of claim 9, wherein the pushrod defines an upper end, and a bifurcated lower end having two elongated prongs defining a space therebetween, and wherein at least a portion of the divider plate is received between the prongs of the pushrod when the pushrod is in the extended position.

11. The device of claim 10, wherein an insert is attached to the lower end of the block member, and wherein the divider plate includes an elongated lower end having a slot that movably receives a center portion of the insert as the guide plate is shifted vertically.

12. The device of claim 11, wherein the insert comprises a relatively thin center web, and vertically-extending opposite outer portions, and wherein the central web defines a lower surface that contacts an upper end of a valve stem in use.

13. The device of claim 12, wherein the outer portions of the insert include inwardly facing surfaces directly adjacent the lower edge of the central web to form a gap therebetween that receives an upper end of a valve stem whereby the insert positions the valve stem vertically and horizontally.

\* \* \* \* \*